United States Patent
Rosenberg

[19]

[11] Patent Number: 5,933,814
[45] Date of Patent: Aug. 3, 1999

[54] AUTOMATIC GOODS ORDERING PROCESS AND DEVICE FOR SALE FACILITIES

[76] Inventor: Andreas Rosenberg, Rümelbachstrasse, CH-8153 Rumlang, Switzerland

[21] Appl. No.: 08/776,045

[22] PCT Filed: Jul. 11, 1995

[86] PCT No.: PCT/CH95/00160

§ 371 Date: Jan. 13, 1997

§ 102(e) Date: Jan. 13, 1997

[87] PCT Pub. No.: WO96/02900

PCT Pub. Date: Feb. 1, 1996

[30] Foreign Application Priority Data

Jul. 14, 1994 [CH] Switzerland .............................. 2250/94

[51] Int. Cl.⁶ ........................................................ G06F 17/60
[52] U.S. Cl. ............................ 705/26; 705/28; 364/478.03
[58] Field of Search ............................ 705/16, 18, 21–28; 186/52–56; 380/24; 364/478.01, 478.03, 478.04, 478.16, 478.17, 478.18; 414/273

[56] References Cited

U.S. PATENT DOCUMENTS

| | | | |
|---|---|---|---|
| 3,541,309 | 11/1970 | Cutter | 235/61.7 |
| 5,158,155 | 10/1992 | Domain et al. | 186/53 |
| 5,186,281 | 2/1993 | Jenkins | 186/55 |
| 5,431,250 | 7/1995 | Schlamp | 186/55 |
| 5,595,264 | 1/1997 | Trotta, Jr. | 186/56 |

FOREIGN PATENT DOCUMENTS

| | | |
|---|---|---|
| 0570913 | 11/1993 | European Pat. Off. . |
| 2563985 | 11/1985 | France . |
| 2592188 | 6/1987 | France . |
| 2693643 | 1/1994 | France . |
| 2694487 | 2/1994 | France . |
| 4134872 | 4/1993 | Germany . |
| 2143661 | 2/1985 | United Kingdom . |

OTHER PUBLICATIONS

C.P. August, "Automated Retailing System", *IBM® Technical Disclosure Bulletin*, vol. 17, No. 9, Feb. 1975, page 2605.

"Computer–Automated Shopping", *IBM® Technical Disclosure Bulletin*, vol. 37, No. 03, Mar. 1994, page 269.

*Primary Examiner*—Allen R. MacDonald
*Assistant Examiner*—Hani M. Kazimi
*Attorney, Agent, or Firm*—Pauley Petersen Kinne & Fejer

[57] ABSTRACT

An automatic goods ordering process and a shopping center for carrying out the process which allow shoppers to shop in an easy, stress-free manner. Furthermore, the operators of such shopping centers are capable of displaying more goods in a smaller area, and of managing stocks in a considerably simplified manner. The desired goods are selected among exhibition samples displayed in the sale facilities and directly ordered by a client identification code. The orders are gathered by a central control unit and transmitted to an automatic storage, where the goods are gathered, placed in baskets and delivered at a distribution point.

8 Claims, 5 Drawing Sheets

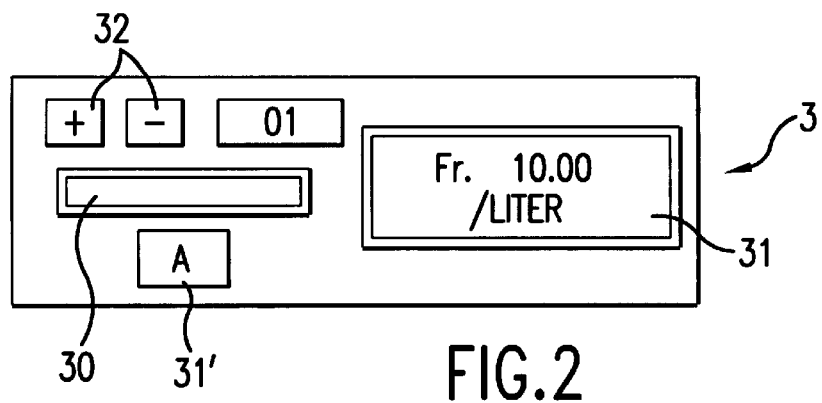
FIG.2
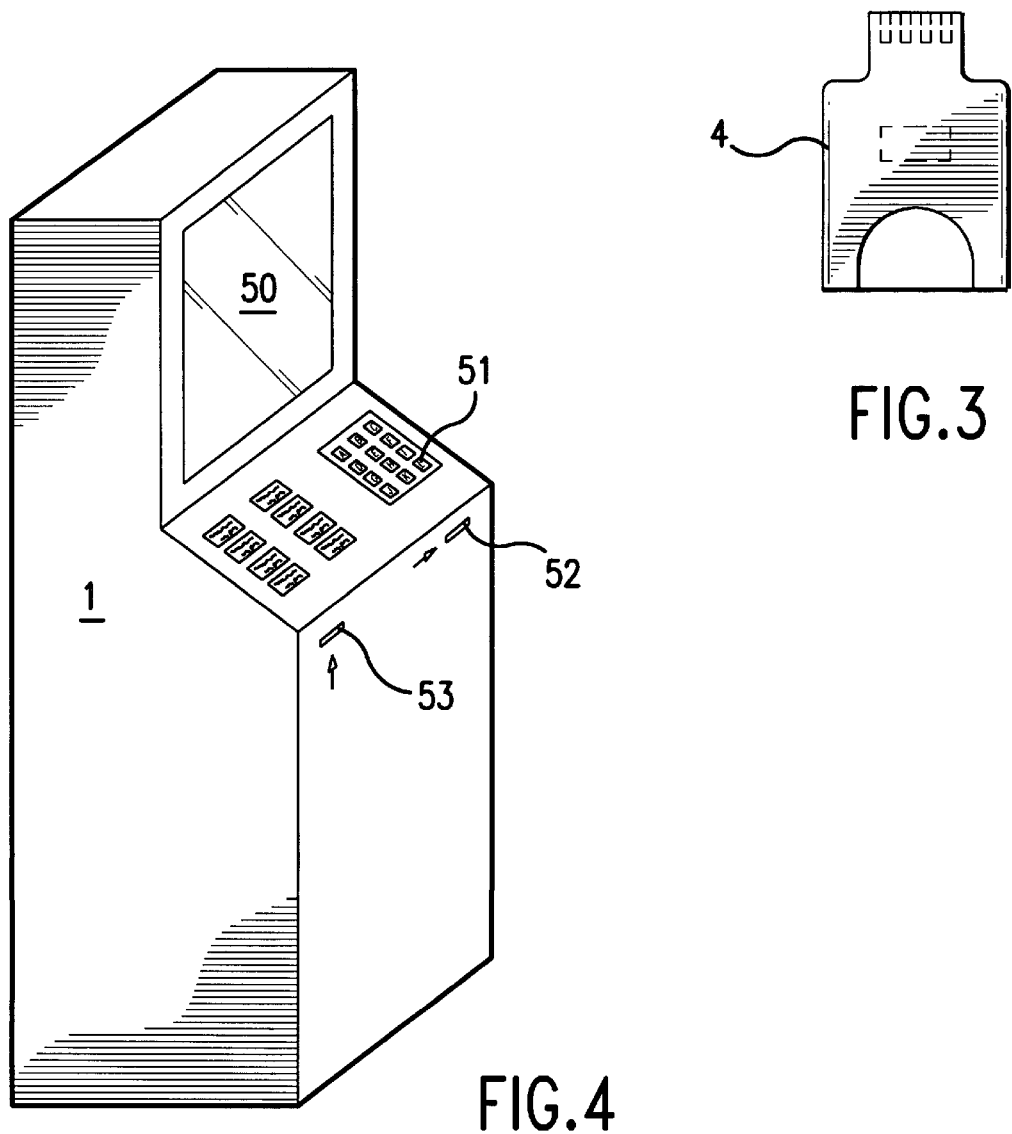
FIG.3
FIG.4

AUTOMATIC GOODS ORDERING PROCESS AND DEVICE FOR SALE FACILITIES

BACKGROUND OF THE INVENTION

1. Field of the Invention

This invention relates to a method for automatic call-up of goods in stores in which at least one virtual sample of the goods is displayed and generally accessible, wherein the goods call-up is operated by an electronic goods call-up unit and is associated with a customer identification code and is registered and transmitted to a warehouse, and wherein the ordered goods are assembled in the warehouse in a customer identification code-specific manner, and there is a central control unit for transfer and administration of all data. This invention also relates to a shopping center for executing the method of this invention.

2. Description of Prior Art

The sales system has hardly changed since the introduction of self-service shopping centers. Shopping carts are available at the entrance to the store, which are then pushed through the store by the customer, who takes the desired items from the shelves and places them into a shopping cart. This system entails several disadvantages.

First, the spaces between the shelves must be sufficiently wide so that two shopping carts can pass each other. Furthermore, a sufficiently large number of each item offered must be ready on the shelves. For this reason such stores require a lot of space, which is a considerable expense at the high rental rates per square meter.

Second, the shelves must be regularly restocked with goods from the warehouse. In stores with a large number of customers, this must take place even during the opening hours. However, this causes obstacles for the customers, since parts of the shelves are inaccessible. Furthermore, the boxes rolled out of the warehouse and the shopping carts get into the way of each other.

Third, the shelves must be regularly inspected in order to remove goods with outdated expiration dates.

Because the goods are freely accessible, theft and vandalism become easier. Stores of this type also have a correspondingly high loss rate.

Shopping is difficult and stressful during the main shopping hours, since the many shopping carts prevent rapid movement. In addition, long lines are created at the cash registers.

Although other known shopping systems, such as catalog sales, do not have this disadvantage, they do not provide a feeling of shopping. The goods cannot be judged beforehand, and it is furthermore necessary to fill out the order coupons with complicated numerical codes.

Shopping systems are furthermore known, which have a certain amount of automation. The customer himself no longer needs to place the goods into a shopping cart in the store, but instead, with the help of samples and with an input device he or she orders the desired goods, which are then put together in a warehouse connected with the input devices.

For example, a system is known from an IBM Technical Disclosure Bulletin, vol. 37, No. 3, and vol. 17, No. 9, which includes a sales room in which there exist a plurality of stations. The customer can place his or her order at these stations by using a customer-specific magnetic card. He or she selects the goods he or she wants to order from images shown on display screens.

The goods for sale can also be seen on display screens in the shopping system, as described in French Patent Reference FR-A-2,592,188.

These shopping systems have the disadvantage that the customers cannot inspect the goods which are for sale, and instead can only select them by images, similar to the known catalog system, and that only the selected pieces are available as samples.

For this reason samples of the goods are displayed in the systems as disclosed by French Patent References FR-A-2,693,643 and FR-A-2,694,487. However, these have been placed in a display case. Input units are available, from which the corresponding goods can be ordered. However, here, too, it is nearly impossible to pick up the goods in the hand and to read for example, the description of the goods or the contents printed on various sides of the packaging. Thus, this system does not bring an improvement in comparison with the known catalog systems.

Systems are also known, in which the customer can pick up sample goods in his or her hands. For example, a shopping system is known from European Patent Reference EP-A-0,570,913, in which the customer can stroll through a store with samples and can place orders by means of a device he or she holds in his or her hand.

German Patent Reference DE-A-4,134,872 describes a shopping system in which samples of the individual goods are arranged in groups on sales tables. An input device with a display screen is a part of each sales table, from which the appropriate goods can be ordered from stock.

One disadvantage of these conventional systems is that many customers are not confident of being able to operate such devices and therefore prefer a well-known shopping system.

SUMMARY OF THE INVENTION

It is therefore one object of this invention to provide a method for selling goods which allows the purchase in stores, but removes the above mentioned disadvantages.

The method in accordance with this invention and the shopping center in accordance with this invention have the advantage that the goods, which are actually intended to be sold, are no longer directly accessible to the customer, but in spite of this the customer can pick up a sample piece in his or her hand and inspect it.

The goods are stored in a warehouse which is connected with the sales room by means of data lines. The method employed by the store for selling the goods can be easily understood by a customer and requires no special knowledge. In the same way as in the known shops, the customer moves around on the sales floor and selects products. But instead of taking them from the shelf and placing them into his or her shopping basket, the customer activates a customer-specific call-up of the goods. The call-up takes place by pushing a customer identification card into a card insertion slot of a goods call-up unit. Since it is possible to clearly associate each sample piece with such a goods call-up unit and no further action or key operation is required, the goods call-up is greatly simplified and does not require any technical knowledge. Thus, the inhibition threshold to the use of such shopping systems is greatly reduced. Thus, each call-up is clearly and simultaneously associated with a single, well defined item and the corresponding customer. If several pieces of the same item are to be ordered, the desired number can be coupled with a single call-up. The order for the goods is forwarded to the warehouse, where the ordered goods are collected for the specific customer. The fact that the goods are no longer displayed in a store, but are kept in a warehouse entails several additional advantages. For example, the supervision and running of the warehouse is simplified, since it is not necessary to also keep the additional, already displayed goods in mind. Goods with outdated expiration dates can be simply removed from the warehouse and need no longer be singled out from the total of still salable goods. In addition, it is possible to store the goods under optimal climatic conditions. This is not assured in the area of the sales floor, since the temperature and humidity conditions in the area fluctuate, depending on how many customers are present there. The method of this invention and the corresponding shopping center are particularly suitable for household goods and grocery stores, general stores, toy stores and electronics stores.

BRIEF DESCRIPTION OF THE DRAWINGS

One preferred embodiment of the subject of this invention is represented in the attached drawings. The method of the invention and the shopping center in accordance with the invention for executing the method will be described below by means of the drawings wherein:

FIG. 2 is a detailed view of the sales shell with the goods call-up unit;

FIG. 3 is a view of a customer identification card;

FIG. 4 is a view of a central information column;

DESCRIPTION OF PREFERRED EMBODIMENTS

The method in accordance with this invention is activated by the customer and is executed by the operator of the shopping center. For this reason it will be described below from the point of view of the customer.

The customer enters the shopping center and instead of looking for a shopping cart, he or she takes a customer identification card 4 from a card column, not shown. An embodiment of such a customer identification card 4 is shown in FIG. 3. Preferably this card 4 is made of a rigid plastic material and therefore has a high degree of resistance, so that it cannot be easily destroyed and therefore has a long life. Each card 4 has a clearly identifiable code. Therefore the card 4 contains a microchip, for example, which is placed into the card 4 as a fixed part and in which a specific card number is stored. Since no further data need to be stored on this card 4, it can be inexpensively manufactured.

Figure 1:
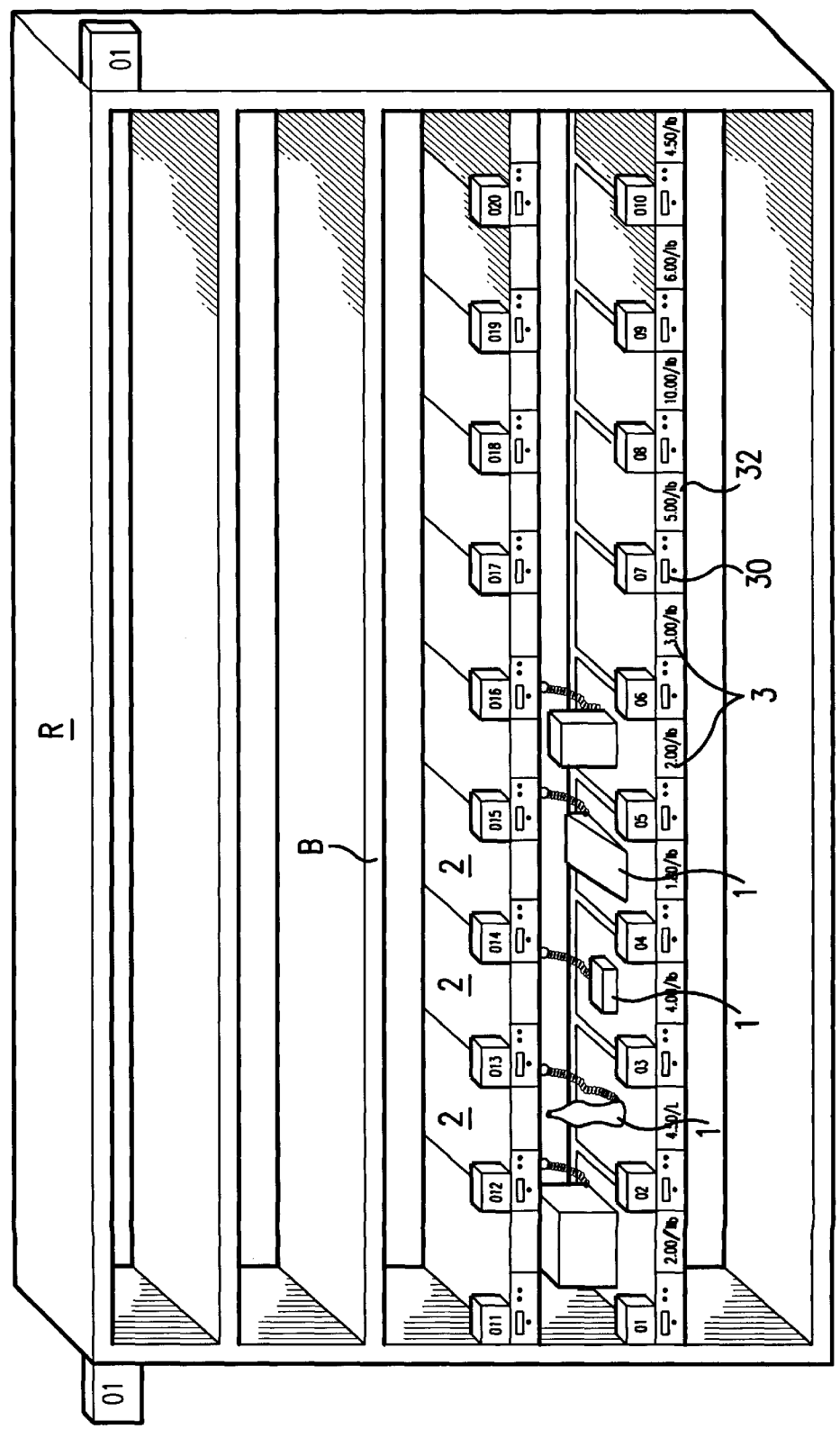
FIG. 1 is a view of a sales shelf inside the actual store in accordance with this invention.

Now the customer enters the actual sales floor, where the shelves R in accordance with this invention are located. An exemplary embodiment of such a shelf R is represented in FIG. 1. This shelf R is divided into shelf sections 2. At least one virtual sample 1 of an item for sale is represented in each shelf section 2. This virtual sample 1 can be picked up and inspected by the customer. In connection with products which are sold often it is also possible to display several virtual samples 1 in one or several sections 2. The virtual sample 1 can be identical with the actually sold product or can merely correspond to a non-perishable imitation. In order to prevent theft or willful removal, the individual virtual samples 1 can be chained, as represented in FIG. 1.

If the customer desires to purchase a corresponding item, he or she activates a goods call-up. For this purpose a goods call-up unit 3, which is clearly associated with a single offered item, is present in the area of each shelf section 2. In this exemplary embodiment the goods call-up unit 3 is integrated into the shelf panels B. The virtual samples 1 are chained.

This goods call-up unit 3 is shown in more detail in FIG. 2. It is a data receiver and transmitter. It has a card insertion slot 30 so that the customer can communicate with it. In addition, it has a display 31, on which the actual sales price of the corresponding item is shown. The sales price can be actualized daily by a central control unit. It is possible in the same way to indicate on it if this product would be momentarily unavailable.

This embodiment in addition has a second display 31', by means of which the customer is alerted to special offers. The goods call-up unit 3 furthermore comprises manual input elements 32 in the form of keys. Each goods call-up unit 3 is connected with a warehouse L to be described later. This connection preferably is made through the central control unit. For activating the goods call-up, all the customer has to do is to insert the customer identification card 4 into the card insertion slot 30. By means of this he or she has ordered a piece of the corresponding goods. The goods call-up unit 3 reads the card code and, together with its own code of the section, which is used to identify the ordered item and is associated with the corresponding shelf section 2, transmits it to the central control unit. If the customer wishes to buy several of the same products, he or she can let the card 4 remain in the card insertion slot 30 and keep an input key depressed until the desired number is counted up on a display. Knowledgeable customers have the option of entering the desired number with the aid of the input keys 32, so that the card 4 only needs to be inserted once. Further inputs or corrections are possible by means of the keyboard.

If this order is the first customer-specific goods call-up, the central control unit opens a customer-specific or card-specific file. All further goods call-ups by means of this customer identification card 4 are now stored in the same file. In this way the customer can walk leisurely through the store and easily place his or her orders, wherein he or she can nevertheless be influenced by the displayed goods.

If the customer should lose count of his or her orders, he or she can go to an information column 1, which are placed at central points in the store. An embodiment of such an information column I is shown in FIG. 4. It is connected by means of data lines with the central control unit and has a display screen 50, an input keyboard 51, a card insertion slot 52 and a record output 53. The customer can now insert the customer identification card 4 into the card insertion slot 52 of the information column I. The specific customer file is opened by this and the ordered items appear on the display screen. The article identification, the number of items ordered, the sales price and the actual sales total of the called up goods are preferably displayed. The customer now has the option of changing the order via the input keyboard 51, in particular to remove products, to correct the number of items or to add products. In addition he or she can have a record of the already ordered goods printed out.

Afterwards the customer can continue with shopping or can go to a cashier station, not shown here, which is also connected with the central control unit. He or she turns in his or her customer identification card 4 at this place. This is again read by an appropriate data receiver or transmitter device, so that the corresponding customer-specific file is called up in the central control unit. This control unit transmits the total sales price of the ordered goods to the cashier station, so that the customer can pay for his or her purchases. Now the cashier station transmits to the control unit that the customer has given his or her approval of the sale and has made or will make payment immediately, whereupon the latter forwards this report to the warehouse L, so that the latter delivers the sold goods to the waiting customer. It furthermore closes the customer-specific file, erases it or copies it for statistical purposes in another section of the computer. If the same customer identification card 4 is again put into circulation, a new, empty customer file can be associated with the same code.

A description of how the assembly in the warehouse L takes place and how an exemplary embodiment of such a warehouse L is laid out follows.

Figure 5:
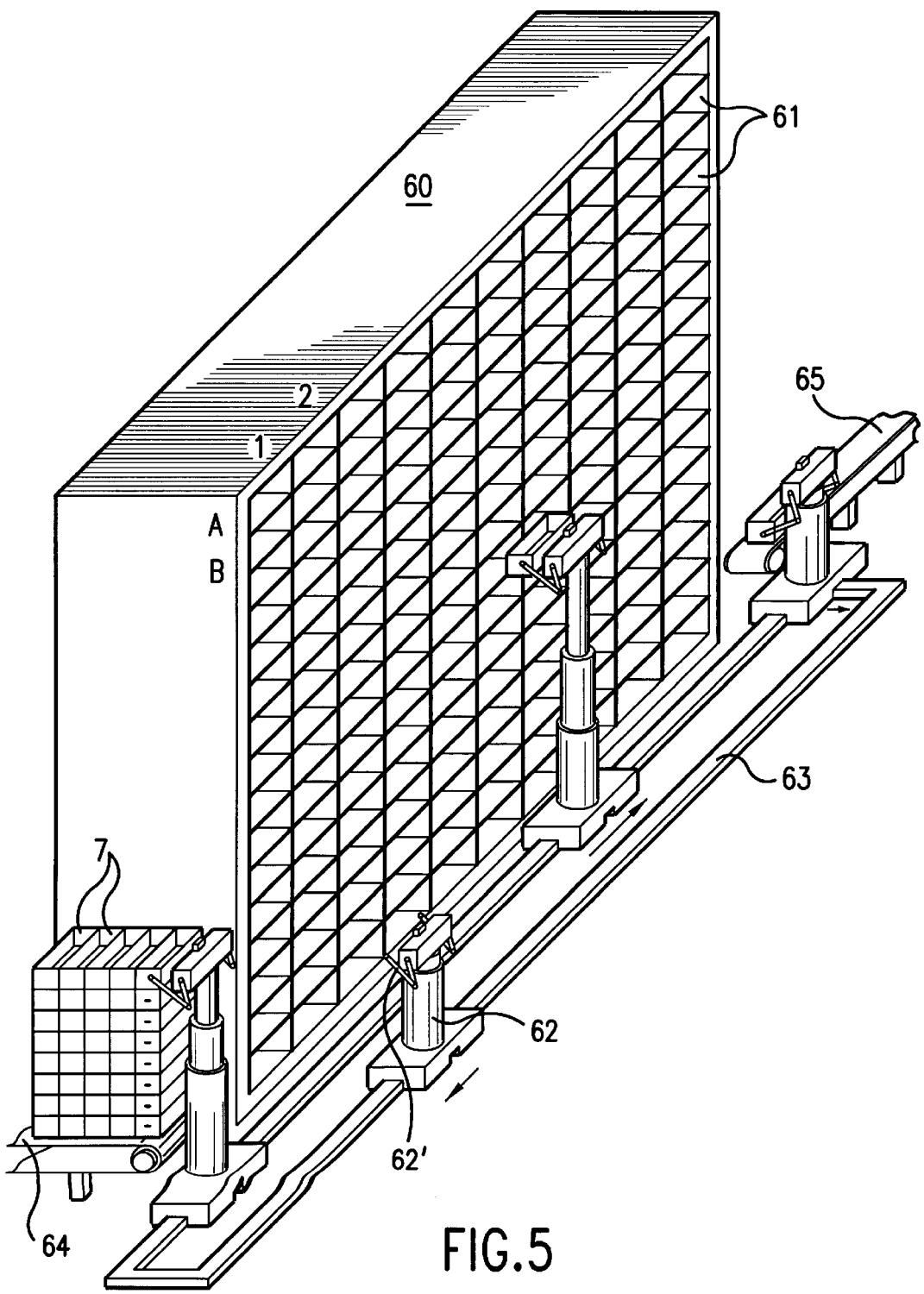
FIG. 5 is a view of a section of the warehouse.

A partial area of such a warehouse is represented in FIG. 5. It includes at least one storage rack 60, which is divided into individual compartments 61. These compartments 61 are coded similar to the sales shelves R., and the goods stored therein can be unequivocally identified by the central control unit. The floors of the compartments 61 preferably have a slight inclination. The goods are located one behind the other in the appropriate compartments, wherein the first product is prevented from falling out by a flap, not represented here. Automatically actuable sliders are disposed in the rear of the compartments 61, which are not visible in the drawing figure. These compartments 61 are filled from the rear. Because of this the older products, which should be sold earlier, are always in front and are therefore taken out first. The time-intensive removal of goods with outdated expiration dates can therefore be omitted or is limited only to the checking of the goods which are in front.

A closed rail loop 63 is laid on the floor in front of the storage rack 60 along its entire length. Self-propelled selectors 62 in the form of robots with gripper arms 62' can be moved on this rail loop 63. Their function will be described later. An incoming conveyor belt 64 terminates at one end of the storage rack 60, an outgoing conveyor belt 65 starts at the other end.

The goods ordered by means of the goods call-up are packaged into shopping baskets 7 in this warehouse. These shopping baskets 7 are designed to be sturdy and can be stacked. The shopping baskets 7 preferably have foldable handles, so that they can be taken home by the customer in place of a carrying bag. So that they do not take up too much space in the house until the next shopping trip, they are preferably foldable or collapsible. Their size is such that a filling volume approximately corresponds to that of a carrying bag. Such shopping baskets require a deposit, so that the baskets taken home are returned during the next shopping trip. In this case the goods baskets are taken to an automatic goods basket return, not shown here, prior to entering the actual store, where the customer is given a credit in the form of a record or a write-off in the customer file already opened by means of the customer identification card 4. The goods baskets brought back in this way are automatically stacked and are moved back again from the goods basket return to the warehouse on the incoming conveyor belt 64.

There, a goods basket 7 is grasped by the gripper arms 62' of a selector 62. Each goods basket is provided with a machine-readable code. This is detected by a sensor and also assigned to the customer-specific file. Controlled by the central control unit or a unit subordinate to the latter, the selector 62 now moves with the goods basket 7 to a defined compartment 61. The flap of the compartment 61 is automatically opened and the product in the front falls out and into the goods basket 7. The selector can be height-adjusted automatically, so that the goods basket 7 can be brought into the area of the corresponding compartment 61 and the drop is not too great. The flap is now closed again and the goods still in the compartment 61 are pushed forward by the slider. Making the customer-specifically bought goods automatically ready in this way requires well thought-out logical devices specially matched to the available assortment of goods, so that the paths of the selectors are as short as possible. Also, the goods which fall one after the other into the goods basket 7 must not damage each other, for example the heavy, hard items must be first packaged, followed by the more vulnerable, easily damaged ones. It is also necessary to determine by means of the list of ordered goods, how many goods baskets 7 are needed all in all, so that they can be made ready together.

Figure 6:
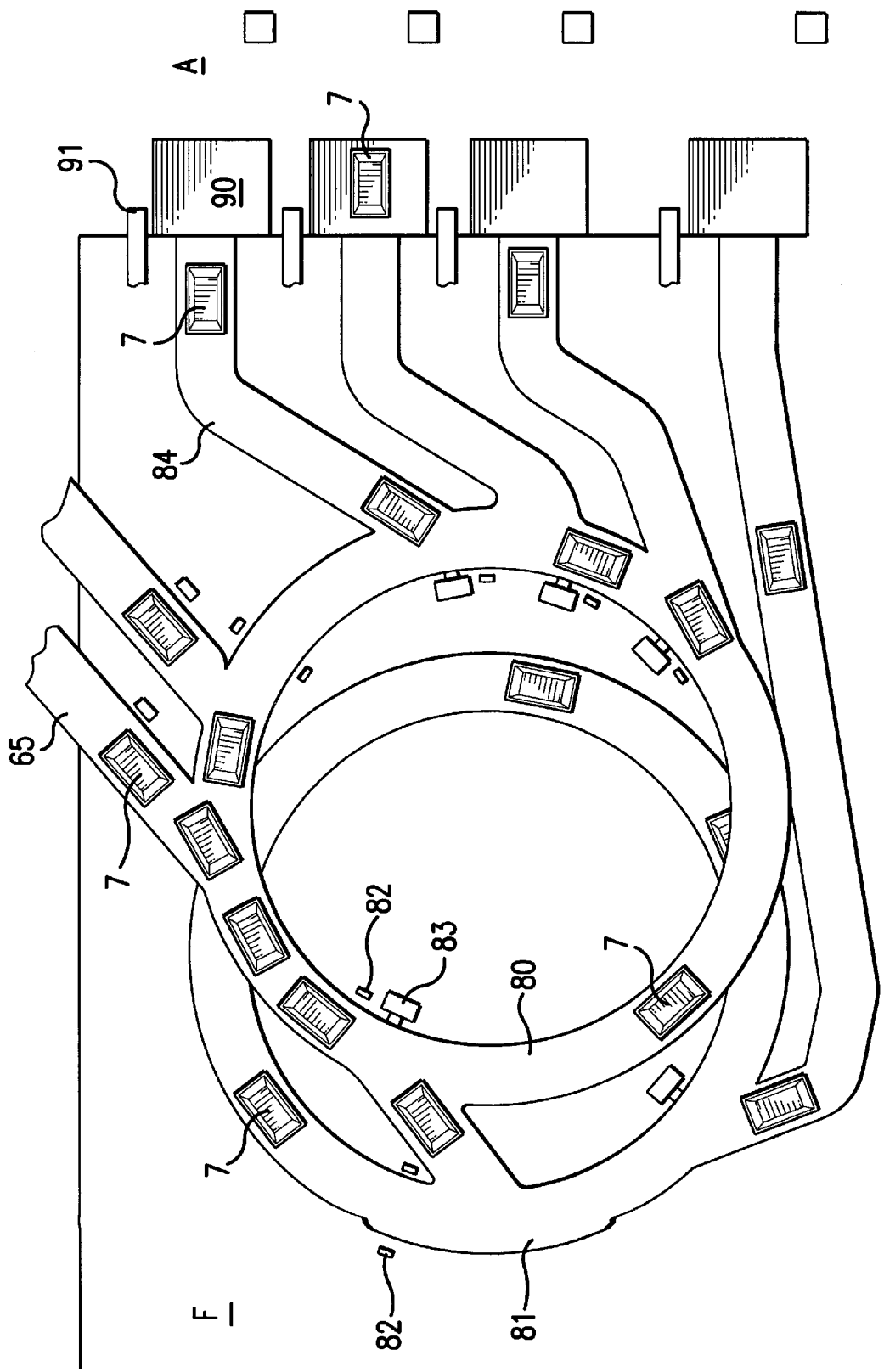
FIG. 6 is a top view of a conveyor installation between the warehouse and the delivery station.

After the ordered or bought goods have been assembled, the selector 62 transfers the goods basket 7 to an outgoing conveyor belt 65. This outgoing conveyor belt 65 is the start of a conveying installation F which, after payment has been made, transports the goods basket 7 to a delivery station A, where the customer can pick it up. As represented in FIG. 6, the conveying installation F preferably comprises at least one main conveying section 80 forming a direct connection between the warehouse L and the delivery station A. The main conveying section 80 is preferably ring-shaped and has several delivery tracks 84, which lead away tangentially, each to a delivery platform 90 of the delivery station A. A sensor 82 is disposed in front of each branch, which identifies the arriving goods basket 7. Furthermore, shunts 83 can guide the respective goods basket 7 to a corresponding delivery platform 90. A delivery display board 91 is provided above each delivery platform 90, on which the delivered goods are announced. This display board is also served by the central control unit. It is possible to determine by means of the sensors 82 whether this goods basket 7 has been removed from the delivery platform 90, so that the next one can be delivered.

The holding loop 81 is a further conveyor loop branching off the main conveying section 80. If the goods basket 7 is not to be delivered directly, it can be brought into this holding loop, where it circles until it is called up by the customer at a special delivery station A'. Sensors 82 and shunts 83 are also arranged along this holding loop 81. Call-up takes place by means of a customer identification card 4. If it is not a personal card 4, it is taken back at the time of the last call-up, so that it can again be used as a fresh card 4 for the next customer.

On the one hand, the method in accordance with this invention has been explained by means of this preferred embodiment. On the other hand the reader will understand that the greatest variations of the sales system and goods call-up system are possible, which are based on the same principle, namely an unequivocal identification of the goods with the customer and the direct coupling of each order with the customer code.

For example, the following discussion relates to possible other preferred embodiments.

In place of the above described customer identification card 4 it is also possible to employ other data carriers provided with customer-specific codes, which for example have magnetic strips and are similar to conventional credit cards. It is also possible to input a code manually into the goods call-up unit. Customers can also regularly have personal cards, which they need not take from a card column.

The central control unit can assume still further functions. It is probably coupled with the warehouse supervision system. At the same time it can also control still further display boards, which are placed inside or in front of the store and draw attention to special offers.

The warehouse does not necessarily have to be fully automatic. Smaller stores can also use warehouse workers which collect the ordered goods manually. The delivery of the goods can also take place personally.

The customer can also request a carrying bag or a shopping bag. Although delivery still takes place in the goods basket 7, in it are one or several carrying bags in which the goods have already been packed.

The shopping center in accordance with this invention can be coupled with the conventional system. The conventional system is mainly recommended for goods which spoil quickly, such as fruit, vegetables and dairy products. These can continue to be bought either by self-service or by a direct sale in a section of the store and they would be brought to the cashier station directly by the customer.

Figure 7A:
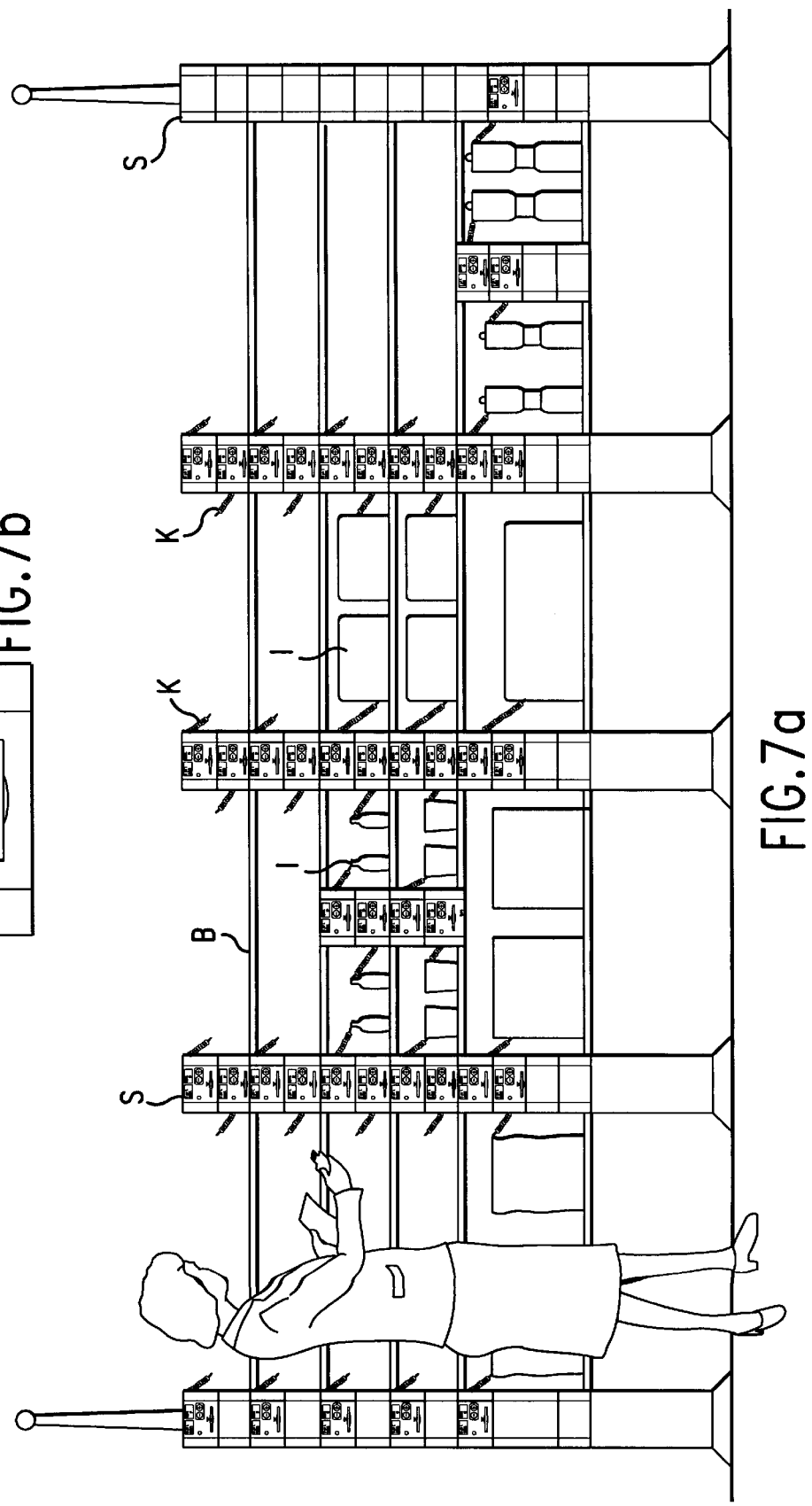
FIGS. 7a and 7b are each a view of a further embodiment of the sales shelf with goods call-up units.
Figure 7B:
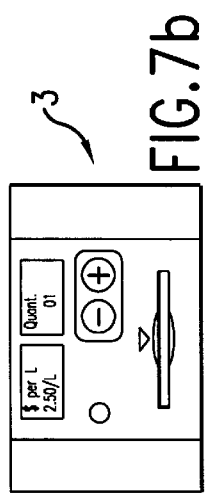

A further embodiment of the sales shelf with goods call-up units 3 is represented in FIG. 7. These are integrated into the supporting columns S of the shelves R. This construction, on the one hand, makes the placement of the data and electrical cables easier, which are conducted inside the columns S. In addition, the flexibility of the shelves R is increased. They are now composed of individual elements. The length of the individual shelf panels B can therefore be selected as needed. The individual virtual samples 1 are again chained, wherein the chains K are fastened on the columns S. In the process the chains K form a connection between the virtual samples 1 and the goods call-up units 3, so that the association is made easier.

I claim:

1. In a method for automatic goods call-up in a store, in which at least one virtual sample (1) of the goods is displayed and generally accessible, wherein the goods call-up is operated by an electronic goods call-up unit (3), wherein the goods call-up is associated with a customer identification code, code-specifically registered and transmitted to a warehouse (L), wherein ordered goods are assembled in the warehouse (L) according to a customer identification code, wherein a central control unit transfers and administers all data, the improvement comprising:

the at least one virtual sample (1) is displayed on a shelf (B) which contains the goods call-up unit (3) for each of the goods, the goods call-up unit (3) is activated by a customer identification card (4) which contains the customer identification code and is insertable into the goods call-up unit (3), so that activation of the goods call-up unit (3) is associated with a single type of the goods;

a goods basket (7) for transporting assembled goods corresponding to the customer identification code in from the warehouse (L) by a conveyor installation to a delivery station (A); and at least one sensor for identifying the goods basket (7) on the conveyor installation and holding the goods basket (7) back in the conveyor installation in at least one holding loop (81) of the conveyor installation until the goods basket (7) is called up by the delivery station (A).

2. In a method in accordance with claim 1, wherein a quantity of the goods call-ups detected in a customer identification code and an associated total sales price are transmitted to a cashier station, from where a customer identification code signal is transmitted to the warehouse (L), and assembled goods are transported to the delivery station (A).

3. In a method in accordance with claim 1, wherein data corresponding to availability of the at least one virtual sample (1) in the warehouse (L) and a corresponding actual sales price are displayed on a display (31) of the goods call-up unit (3).

4. In a self-service shopping center having a sales floor with a plurality of shelves (R) in each of which at least one virtual sample (1) of a plurality of goods is displayed, a warehouse (L) for storing the goods, a cashier station, a goods call-up unit (3) for automatic call-up of the goods from the warehouse (L), wherein the goods call-up unit (3) is connected by way of a central control unit with a warehouse (L), and the central control unit is connected with the cashier station and is connected with respect to data transfer with the warehouse (L), the improvement comprising:

the goods call-up unit (3) being integrated in one of the shelves (R), the goods call-up unit (3) being associated with a type of the goods, and the goods call-up unit (3) having a card insertion slot (30) into which a customer identification card (4) is insertable;

a goods basket transporting assembled goods corresponding to the customer identification card (4) from the warehouse (L);

a delivery station (A) connected to the warehouse (L) with a conveyor belt installation (F) that accommodates the goods basket the conveyor belt installation (F) having a main conveyor section (80) connected to distribution platforms (90) in the delivery station (A) through distribution tracks (84) that form a plurality of junctions along the main conveyor section (80); and at least one sensor (82) identifying the goods basket at one of the plurality of junctions and directing the goods basket to at least one of the distribution platforms (90).

5. In a self-service shopping center in accordance with claim 4, wherein the goods call-up unit (3) is integrated into a supporting column (S) of the shelves (R).

6. In a self-service shopping center in accordance with claim 5, wherein the goods call-up unit (3) is integrated into a shelf panel (B).

7. In a self-service shopping center in accordance with claim 5, wherein the goods call-up unit (3) has a display (31).

8. A self-service shopping center according to claim 4 wherein the conveyor belt installation (F) branches off from the main conveyor section (80) into a holding loop (81).

* * * * *